United States Patent [19]

Limbert

[11] 4,260,537

[45] Apr. 7, 1981

[54] STABILIZED POLYCARBONATE COMPOSITIONS

[75] Inventor: Frank J. Limbert, Pittsburgh, Pa.

[73] Assignee: Mobay Chemical Corporation, Pittsburgh, Pa.

[21] Appl. No.: 657,653

[22] Filed: Feb. 12, 1976

[51] Int. Cl.³ .................. C08K 5/13; C08K 5/34; C08K 5/52
[52] U.S. Cl. .................. 260/45.85 B; 260/45.7 R; 260/45.8 NT; 260/45.95 D; 260/45.95 C
[58] Field of Search .................. 260/45.85 B, 45.95 B, 260/45.95 H

[56] References Cited

U.S. PATENT DOCUMENTS

| 2,581,907 | 1/1952 | Smith, Jr. et al. | 260/45.95 H |
|---|---|---|---|
| 3,186,962 | 6/1965 | Ranson | 260/45.95 B |
| 3,238,178 | 3/1966 | Kibler et al. | 260/45.95 H |
| 3,239,484 | 3/1966 | Stark | 260/45.9 NC |
| 3,330,859 | 7/1967 | Dexter et al. | 260/45.85 B |
| 3,334,154 | 8/1967 | Kim | 260/860 |
| 3,398,212 | 8/1968 | Jackson, Jr. et al. | 260/860 |
| 3,637,907 | 1/1972 | Mathis et al. | 260/45.8 NT |
| 3,647,747 | 3/1972 | Bialous | 260/45.7 R |
| 3,915,926 | 10/1975 | Wambach | 260/40 R |
| 3,956,361 | 5/1976 | Stephen | 260/45.85 B |

*Primary Examiner*—Howard E. Schain
*Assistant Examiner*—R. A. White
*Attorney, Agent, or Firm*—Gene Harsh; Lawrence S. Pope; Thomas W. Roy

[57] ABSTRACT

Polycarbonate resins which contain sufficient halogenated phenolic residues to impart fire retardant characteristics to articles molded therefrom are stabilized by the addition of a hindered phenol selected from the group consisting of a high molecular weight hindered phenol phosphate, a high molecular weight hindered phenol cyanurate, an ester of a hindered phenolic carboxylic acid and an alcohol having 10–26 carbon atoms, and the reaction of a hindered phenol and an aldehyde. The polycarbonates with the stabilizers of the invention exhibit improved melt flow stabilities and hydrolytic aging characteristics over conventionally stabilized polycarbonates and in most cases over unstabilized polycarbonates.

21 Claims, No Drawings

STABILIZED POLYCARBONATE COMPOSITIONS

BACKGROUND OF THE INVENTION

1. Field of the Invention

This invention relates to polycarbonates, and more particularly to polycarbonates having improved melt stability and resistance to hydrolysis.

2. Description of the Prior Art

Polycarbonates derived from reactions involving organic dihydroxy compounds and carbonic acid derivatives have found extensive commercial application because of their excellent mechanical and physical properties. These thermoplastic polymers are particularly suited for the manufacture of molded products where impact strength, rigidity, toughness, thermal and dimensional stability as well as excellent electrical properties are required.

However, these polymers exhibit a brief though definite burning time when contacted with an open flame and do not meet a specified requirement for flammability resistance in applications where high temperatures and/or exposure to fire may be encountered.

In order to improve the flammability resistance of the polycarbonate various approaches have been pursued including the incorporation of halogenated phenolic diols into the polycarbonate polymer chain. Typically copolymers of tetrahalobisphenol A and bisphenol A are used to impart improved flammability resistance to the polycarbonate. However, unless the quantity of the halogenated bisphenol in the copolymer is very minor, the copolymers have such high fabrication temperatures that the halogen atoms tend to be liberated at processing temperatures tending to degrade the polymer and reduce its properties. Further after the molded polycarbonate is formed, the halogenated phenolic diol tends to contribute to hydrolytic instability of the article causing a degradation in mechanical and physical properties. On the other hand, when only a small amount of halogenated phenolic diol is incorporated into the copolymer the necessary flame retardancy is not provided to the polycarbonate.

Mixtures of homopolymeric non-halogenated polycarbonates and homopolymeric tetrachlorobisphenol-A polycarbonate as described in U.S. Pat. No. 3,038,874 and mixtures of homopolymeric non-halogenated polycarbonates with copolymers of tetrabromobisphenol-A and other phenols, glycols, carboxylic acids and the like as disclosed in U.S. Pat. No. 3,334,514 and various other mixtures of homopolymeric halogenated bisphenol-A polycarbonates have been proposed in order to cure the forgoing difficulties.

Although brominated polycarbonates do not require fabrication temperatures as high as those which must be used when chlorine-containing polymers and copolymers are used, nevertheless, the less tenaceious bromine atom much more readily splits off under polycarbonate processing conditions and severely degrades the polymer rendering it commercially useless even when mixtures of homopolymer and copolymeric brominated polycarbonates are used in which the concentration of the halogen containing copolymers in the admixture is very low, i.e. even before the halogenated polymer is present at a concentration sufficient to permit to act as an effective flame retardant.

In order to remedy the deficiencies of the halogenated polycarbonate polymers many additives have been incorporated into the polycarbonate; phosphite stabilizers such as those disclosed in U.S. Pat. Nos. 3,509,091, 3,205,269, 3,305,520, 3,342,767, 3,398,115, 2,867,594 and Canadian Patent 646,424 representatively, have shown utility in stabilizing halogenated polycarbonate copolymers. Further, phosphites in combination with barium carbonate, strontium carbonate and/or calcium carbonate have substantially improved the stability of halogenated polycarbonates as is taught by U.S. Pat. No. 3,733,296. However, even with the foregoing recited stabilizers, the halogenated polycarbonates exhibit degradation due to susceptability to hydrolysis.

Thus in accordance with the present invention halogenated polycarbonates are provided with increased thermal and hydrolytic stability.

SUMMARY OF THE INVENTION

A polycarbonate is provided which contains a copolymer of a dihydroxy compound and a halogenated phenolic diol and is stabilized with an effective amount of a hindered phenol selected from the group consisting of:

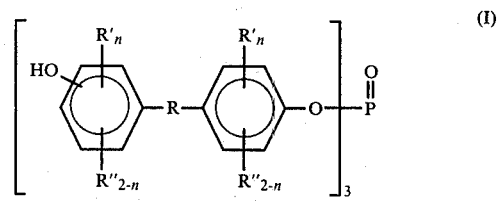

wherein R is a saturated aliphatic hydrocarbon group (alkylidenes and alkylenes) having 1–8 carbon atoms, and preferably having 1–5 carbon atoms. More preferably, R can be methylene, ethylene, isopropylene, ethylidene, n-propylidene, and isopropylidene. The most preferred R group is methylene.

R' is a bulky hydrocarbon group and is ortho to the —O— attached to the aromatic ring. R" is any substituent which will occupy the position para to the —OH group attached to each ring when it is unfilled and n=1 or 2.

(II) The reaction product of a reactive triazine and a compound represented by the structural formula:

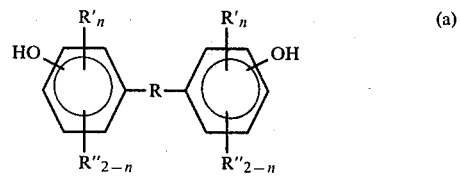

wherein, R, R', R" and n are as previously described in (I) and the triazine is reacted through a triazine ring carbon and the diphenol (a) is reacted through one of the OH groups on each of three (a) molecules.

(III) The reaction product of an aldehyde with a phenol of the structural formula:

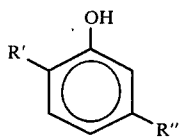

wherein R' and R" are as previously described; and (IV) A hindered phenol of the structural formula:

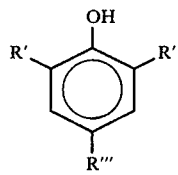

wherein R' is as previously described and R'" is an organic residue.

DETAILED DESCRIPTION OF THE INVENTION

When used herein "polycarbonate resin" means the neat resin without additives; "Polycarbonate" means both the formulated polycarbonate resin with additives therein and also the final molded plastic product.

The polycarbonate resins useful in practice of the invention are those having a weight average molecular weight of 10,000 to 200,000 and preferably those which have a melt flow rate of 1 to 24 g/10 min (ASTM 1238) and are produced by reacting di-(monohydroxyaryl)-alkanes or dihydroxybenzenes and substituted dihydroxybenzenes and a di-(monohydroxyhaloaryl) alkane with derivatives of the carbonic acids such as carbonic acid diesters, phosgene, bis-chloro-carbonic acid esters of di-(monohydroxyaryl)alkanes and the bis-chloro-carbonic acid esters of the dihydroxybenzenes and the substituted dihydroxybenzenes.

The two aryl residues of the di-(monohydroxyaryl)alkanes applied according to the invention can be alike or different. The aryl residues can also carry substituents which are not capable of reacting in the conversion into polycarbonates, such as alkyl groups, for example, the methyl, ethyl, propyl or tert-butyl groups. The alkyl residue of the di-(monohydroxyaryl)-alkanes linking the two benzene rings can be an open chain or a cycloaliphatic ring and may be substituted, if desired, for example by an aryl residue.

Suitable di-(monohydroxyaryl)-alkanes are for example (4,4'-dihydroxy-diphenyl)-methane, 2,2'-(4,4'-dihydroxydiphenyl)-propane, 1,1-(4,4'-dihydroxy-diphenyl)-cyclohexane, 1,1-(4,4'-dihydroxy-3,3'-dimethyl-diphenyl)-cyclohexane, 1,1-(2,2'-dihydroxy-4,4'-dimethyl-diphenyl)-butane, 2,2-(2,2'-dihydroxy-4,4'-di-tert.-butyl-diphenyl)-propane or 1,1'-(4,4'-dihydroxy-diphenyl)-1-phenyl-ethane, furthermore methane derivatives which carry besides two hydroxyaryl groups an alkyl residue with at least two carbon atoms and a second alkyl residue with one or more carbon atoms, such as 2,2-(4,4'-dihydroxy-diphenyl)-butane, 2,2-(4,4'-dihydroxydiphenyl)-pentane (melting point 149°–150° C.), 3,3-(4,4'-dihydroxy-diphenyl)-pentane, 2,2-(4,4'-dihydroxy-diphenyl)hexane, 3,3-(4,4'-dihydroxy-diphenyl)-hexane, 2,2-(4,4'-dihydroxy-diphenyl-4-methyl-pentane, 2,2-(4,4'-dihydroxydiphenyl)-heptane, 4,4-(4,4'-dihydroxy-diphenyl)-heptane (melting point 148°–149° C.) or 2,2-(4,4'-dihydroxy-diphenyl) tri-decane. Suitable di-(monohydroxyaryl)-alkanes, the two aryl residues of which are different are, for example, 2,2-(4,4'-dihydroxy-3'-methyl-diphenyl)-propane and 2,2-(4,4'-dihydroxy-3-methyl-3'-isopropyl-diphenyl)-butane. Suitable di-(monohydroxyaryl)-alkanes. The di(monohydroxyhaloaryl)-alkanes are for instance 2,2-(3,5,3'5'-tetrachloro-4,4'-dihydroxy-diphenyl)-propane, 2,2-(3,5,3'5'-tetrabromo-4,4'-dihydroxy-diphenyl)-propane (tetrabromobisphenol A), (3,3'-dichloro-4,4'-dihydroxy-diphenyl)methane and 2,2'-dihydroxy-5,5'-difluoro-diphenyl-methane. Suitable di-(monohydroxyaryl)-alkanes, the alkyl residue of which, linking the two benzene rings, is substituted by an aryl residue are for instance (4,4'dihydroxy-diphenyl)phenyl-methane and 1,1-(4,4'-dihydroxy-diphenyl)-1-phenylethane.

Suitable dihydroxybenzenes and substituted dihydroxybenzenes are hydroquinone, resorcinol, pyrocatecol, methyl hydroquinone and the like. Other suitable di-hydroxyaromatic compounds are 4,4'-dihydroxy-diphenylene, 2,2'-dihydroxydiphenylene, dihydroxynapthalene, dihydroxyanthracene and compounds represented by the structural formula:

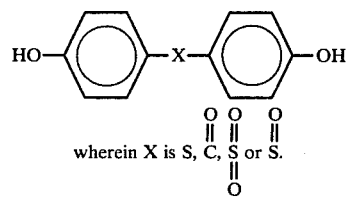

wherein X is S, C, S or S.

In order to obtain special properties, mixtures of various di-(monohydroxyaryl)-alkanes can also be used, thus mixed polycarbonate resins are obtained. By far the most useful polycarbonate resins are those based on 4,4'-dihydroxy-diaryl methanes and more particularly bisphenol A [2,2-(4,4'dihydroxy-diphenyl)-propane]. Thus the flame retardant characteristics are preferably imparted to the basic polycarbonate resin by a mixture of bisphenol A and tetrabromobisphenol A [2,2-(3,5,3',5'-tetrabromo-4,4' dihydroxy-diphenyl)-propane] reacted with phosgene or a like carbonic acid derivative.

The polycarbonate resins are prepared by methods known to those skilled in the art and more particularly by methods disclosed in U.S. Pat. Nos. 3,028,365, 2,999,846, 3,248,414, 3,153,008, 3,215,668, 3,187,065, 2,964,974, 2,970,137, 2,991,273 and 2,999,835 all incorporated herein by reference.

In preparing the preferred polycarbonates which are to have flame retardant characteristics sufficient tetrabromobisphenol A should be added to form the polymer to provide 3 to 8 percent by weight of bromine based on the weight of the polymer. Also, the bromine containing polycarbonate resin should have a melt flow rate approximating the polycarbonate with which it is to be blended if polymer blending is the technique utilized to provide a bromine containing polymer.

The barium carbonate, strontium carbonate and/or calcium carbonate may be incorporated into the polycarbonate at a level of about 0.01 to 5 percent by weight based on the weight of the polycarbonate resin. Although the above carbonates have been used in stabilizing polycarbonates, they have been used in combination with phosphites as is shown in U.S. Pat. No. 3,733,296 and not in combination with the hindered phenolic compounds of the invention.

The hindered phenolic compounds in accordance with the structure:

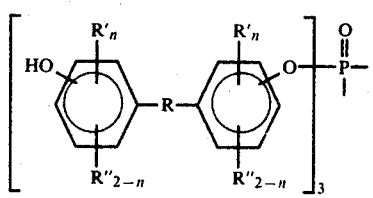

are more fully described in U.S. Pat. No. 3,812,220 incorporated herein by reference. n is 1 or 2, and R is independently selected from saturated aliphatic hydrocarbon linkages (i.e. alkylidenes and alkylenes) of 1–8 carbon atoms, and preferably 1 to 5 carbon atoms. More preferably R can be methylene, ethylene, isopropylene, ethylidene, n-propylidine and isopropylidine. The most preferred R group is methylene. R' is a bulky hydrocarbon alkyl group having 4–22 carbon atoms, such as t-butyl, t-amyl, t-hexyl, cyclohexyl, t-pentyl, t-octyl phenyl, naphthyl, a-methylcyclohexyl, t-nonyl, benzyl, menthyl, isobornyl, phenanthryl, anthranyl, norbornyl, cyclopropyl, cyclopentyl, bicyclohexyl, cyclobutyl, 1,2-dimethylcyclopropyl, and xylyl. More preferably R' is a bulky hydrocarbon of from 4–12 carbon atoms. It is especially preferred that the bulky hydrocarbon group is an alkyl group. This applies to the preferred carbon atoms range of 4–22 as well as to the more preferred carbon atoms range of 4–12. The most preferred bulky hydrocarbon group is t-butyl. Thus, preferably R' contains the tertiary carbon which is attached to the aromatic ring. Where R' does not contain a tertiary carbon, R' is of sufficient bulk to prevent the reaction of the —OH group which would inactivate the stabilizer. R" is independently selected from alkyls of 1 to 22 carbon atoms. Preferably, the hydroxyl group on one ring and the oxygen residue of same after removal of hydrogen on the other ring are both ortho or para to R and all ortho and para positions to said hydroxyl and oxygen residue are substituted. One bisphenol moiety can be attached to the phosphorous atom through both hydroxyls by removal of hydrogen to form a ringed substituent. The preferred compounds are tris[2-(2-hydroxy-3-t-butyl-5-methyl benzyl)-4-methyl-6-t-butylphenyl] phosphate; tris [2-(2-hydroxy-3-tert-butyl-5-chlorobenzyl)-4-chloro-6-tert-butylphenyl] phosphate and tris [4-(4-hydroxy-3,5-ditert-butyl-benzyl)-2,6-ditert-butylphenyl] phosphate. And most preferably:

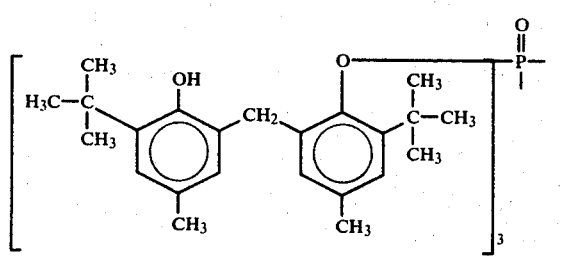

which is tris [2-(2-hydroxy-3-t-butyl-5-methylbenzyl)-4-methyl-6-t-butylphenyl] phosphate.

The hindered phenols in accordance with structure II, the reaction product of a triazine and the bisphenol (a), are more fully described in U.S. Pat. No. 3,729,471 incorporated herein by reference. The triazines are those which have reactive groups such as the trihalide triazines. The preferred triazine compounds are the trihalide triazines such as the chlorides, bromides, and iodides. Examples of some suitable halide triazines are 2,4,6-trichloro-1,3,5-triazine (cyanuric chloride); 2,4,6-triiodo-1,3,5-triazine (cyanuric iodide); 2,4,6-tribromo-1,3,5 triazine (cyanuric bromide); 2,4,6 trifluoro-1,3,5-triazine (cyanuric fluoride); 2-chloro-4,6-dihydroxy-1,3,5-triazine; 2-chloro-4,6-difluoro-1,3,5-triazine; 2-fluoro-4,6-dichloro-1,3'5-triazine; 2-fluoro-4,6-dichloro-1,3,5-triazine; and 2-chloro-4,6-diiodo, 1,3,5-triazine. The most preferred compound is 2,4,6-trichloro-1,3,5-triazine (cyanuric chloride). The bisphenol compounds (a) are represented by the structural formula:

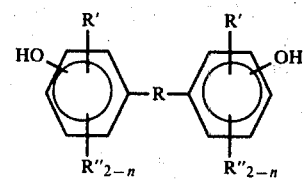

wherein R, R', R" and n are as previously described.

The OH group on each ring can be in any position but preferably is either ortho or para to the hydrocarbon linkage and is most preferably in the ortho position. More detailed descriptions of the reactants to form the stabilizing reaction product are shown in U.S. Pat. No. 3,729,471 previously referred to herein. The preferred stabilizers are 2,4,6-tris [2-(2-hydroxy-3-tert-butyl-5-chlorobenzyl)-4-chloro-6-tert-butylphenol] cyanurate;

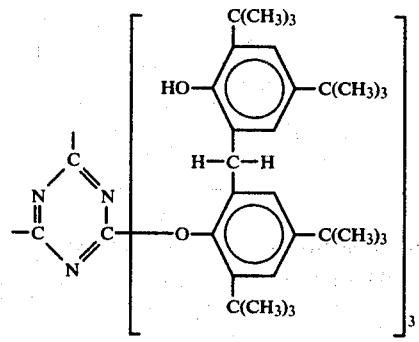

which is 2,4,6-tris [2-(2-hydroxy-3,5-di-tert butyl benzyl)-4,6-di-tert-butyl phenyl] cyanurate;

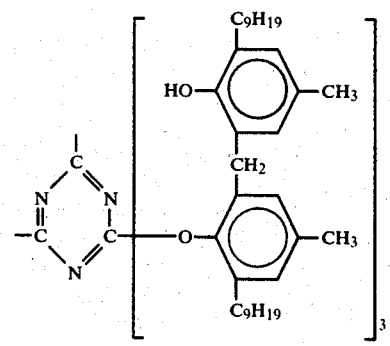

and most preferably

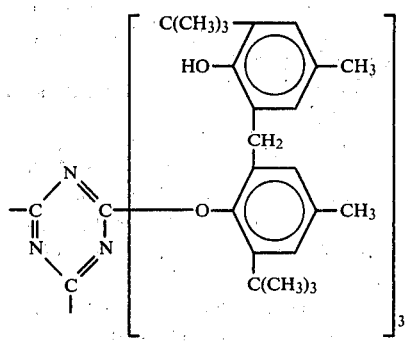

which is 2,4,6-tris-[2-(2-hydroxy-3-tert-butyl-5-methyl-benzyl)-4-methyl-6-tert-butyl phenyl] cyanurate.

The hindered phenol stabilizer is represented by the structural formula

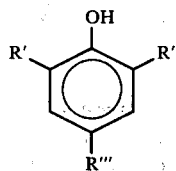

wherein R' and R' are as previously described and R''' being an organic unbranched residue having at least 10 carbon atoms and may contain ester or ether groups. The preferred compound is octadecyl 3-(3',5'-di-tert-butyl-4'-hydroxy phenyl) propionate represented by the structural formula

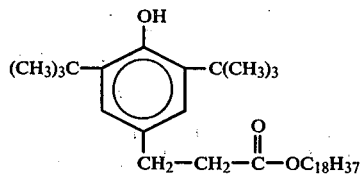

The reaction product of the aldehyde with the phenol of the structural formula

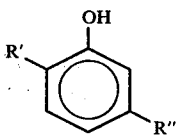

wherein R' and R are as previously described is a 1 aldehyde:3phenol reaction product. The reaction and purification are procedures known to those skilled in the art and are in accordance with normal phenol α-β unsaturated aldehyde reaction mechanisms, in the presence of acid. The aldehydes useful are preferably the α-β unsaturated aldehydes such as acrolein, cinnimaldehyde, crotonaldehyde, and the like. The most preferred embodiment is the 3:1 condensate of 3 methyl, 6 tertiary butyl-phenol with crotonaldehyde. The compound so prepared is a white crystalline powder having a melting point of 182.5°–188° C.

The reaction scheme is theorized to be as follows:

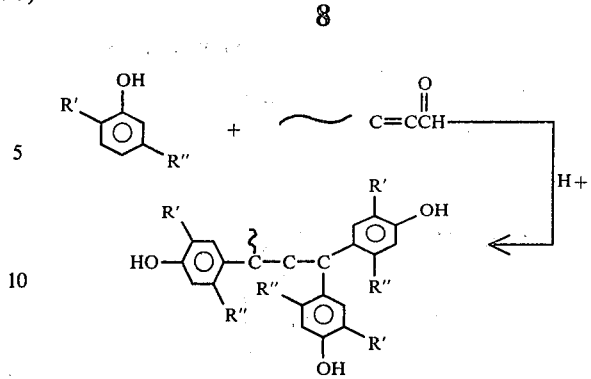

Thus the phenolic compound is reacted through the aldehyde and the α-β unsaturated group of aldehyde.

All of the above stabilizers are preferably used at a level of 0.05 to 1 percent by weight based on the weight of the polycarbonate resin.

Although all of the above compounds have been used as stabilizers for hydrocarbon resins, polyvinyl chloride, polystyrene, polyamides, and the like, surprisingly it has been herein discovered that these organic hindered phenol stabilizers are advantageous for use with polycarbonate resins containing halogens. They are further advantageous when used in conjunction with barium carbonate, strontium carbonate and/or calcium carbonate.

The effectiveness of the stabilizers of the invention is believed to be a function of their molecular weight. Since all of the stabilizers are of relatively high molecular weight the stabilizer does not tend to diffuse through the polycarbonate resin and hence remains within the polycarbonate during aging. A preferred molecular weight range for the stabilizers of the invention is about 450 to 1600.

The invention will be further ellucidated by the following examples.

EXAMPLE I

A polycarbonate resin was synthesized using phosgene, tetrabromobisphenol A and bisphenol A, in accordance with known procedures for producing such polymer. Sufficient tetrabromobisphenol A was used to produce a polycarbonate resin having a melt flow rate of 5.2 g/10 min at 300° C. (ASTM 1238) and having 10 percent by weight bromine. The bromine containing polycarbonate resin was tumble blended with a bisphenol A phosgene polycarbonate resin having a melt flow of 7.0 grams/10 minutes at 300° C. (ASTM D1238) at a 50/50 weight ratio thus producing a polycarbonate resin blend having 5 percent by weight bromine. After tumble blending the mixture was extruded through an extruder and tested for various properties. Oxygen index was measured by ASTM D2683 and the heat humidity aging was conducted by molding samples and aging them at 70° C. at 100% relative humidity and calculating their half-life durability by measuring percent impact strength retention after 5, 10, 20 and 40 days aging. In the half-life testing an average of 3 samples for each data point is reported. The calculated half-life durability is the time taken during aging for the sample to reach one half of its original impact strength. Test results are reported on Table I. In the following examples the ingredients are in percent by weight, and are based on the weight of the polycarbonate resin.

EXAMPLES II-X

Example I was repeated except various stabilizers were added to the polycarbonate resin blend. These samples were tested for various properties with such test results reported on Table I.

creased with the addition of the stabilizers of the invention

EXAMPLES XI-XVII

A polycarbonate resin blend was prepared as in Examples II-X to form a resin with 5% bromine therein;

TABLE I

| Example | Stabilizer | Concentration % | Melt Flow rate g/10 min at 300° C. | Oxygen Index % | Izod Impact Ft.-lb/in | Half-Life Days |
|---|---|---|---|---|---|---|
| I | None | — | 6.4 | 29.1 | 3.06 | 87.1 |
| II | [2-(2-hydroxy-3-t-butyl-5-methylbenzyl) 4-methyl-6-t-butyl] phosphate | 0.1 | 7.1 | 30.5 | 3.39 | 108 |
| III | [2-(2-hydroxy-3-t-butyl-5-methylbenzyl) 4-methyl-6-t-butyl] phosphate | 0.25 | 7.8 | 31.9 | 2.69 | 152 |
| IV | [2-(2-hydroxy-3-t-butyl-5-methylbenzyl) 4-methyl-6-t-butyl] phosphate | 0.50 | 8.0 | 28.2 | 2.37 | 83.7 |
| V | octadecyl 3-(3'-5'-di-tert-butyl-4'hydroxy phenyl)propionate | 0.1 | 7.2 | 28.2 | 2.57 | 85.7 |
| VI | octadecyl 3-(3'-5'-di-tert-butyl-4'hydroxy phenyl)propionate | 0.25 | 6.8 | 28.1 | 2.84 | 107.2 |
| VII | 2,4,6,-tris[2-(2-hydroxy 3-t-butyl 5-methyl benzyl)-4-methyl 6-t-butylphenyl]cyanurate | 0.25 | 9.6 | 29.7 | 2.26 | 90.4 |
| VIII | 3:1 condensate of 3-methyl-6-tert-butylphenol with crotonaldehyde | 0.1 | 7.2 | 28.8 | 3.40 | 148 |
| IX | distearyl pentaerythritol diphosphite | 0.1 | 7.9 | — | 2.28 | 48.3 |
| X | tri(mixed mono and dinonyl phenyl) phosphites | 0.1 | 8.0 | 27.6 | 2.53 | 56.8 |

As is shown in Table I the samples containing the phenolic stabilizers of the invention are superior to the conventional phosphite stabilizers (Examples IX and X) used in polycarbonates. Although polycarbonate resin, as demonstrated by Example I, shows an acceptable impact half-life value, this value is in most cases, inalong with the stabilizer, 0.5 percent of $BaCO_3$, 0.5 percent of the cerotic acid ester of ceryl alcohol, and 0.75 percent of $TiO_2$ pigment were blended. Various stabilizers were added to the polycarbonate resin by tumble blending and extruding. Samples were tested for melt stability, impact, impact aging and oxygen index. The test results are reported on Table II.

TABLE II

| Properties and Compositions | XI | XII | XIII | XIV | XV | XVI | XVII |
|---|---|---|---|---|---|---|---|
| Stabilizer | 3:1 Reaction Product 3 methyl 6 t-butyl-phenol: croton-aldehyde | 2,4,6-tris[2-(2-hydroxy-3 tert butyl-5-methyl (benzyl)-4-methyl-6-tert butyl-phenyl]-cyanurate | tris[2-(2-hydroxy-3-t-butyl 5-methyl (benzyl)-4-methyl-6-t-butylphenyl] phosphate | tris[2-(3-hydroxy-3-t-butyl 5-methyl (benzyl)-4-methyl-6-t-butylphenyl]-phosphate | octadecyl 3-(3', 5'-di-tert-butyl)-4'-hydroxy-phenyl) propionate | phenyl-neo-pentyl phosphite | distearyl-pentaery-thritol diphos-phate |
| Concentration | 0.1% | 0.1% | 0.1% | 0.25% | 0.25% | 0.1% | 0.1% |
| Melt Stability Pa's 300° C. 72 sec$^{-1}$ after aging at | | | | | | | |
| 5 min. | 400 | 390 | 460 | 490 | 530 | 410 | 410 |
| 35 min. | 280 | 350 | 420 | 460 | 450 | 430 | 380 |
| 65 min. | 300 | 380 | 440 | 440 | 440 | 400 | 400 |
| Δ(5-65) | 100 | 10 | 20 | 50 | 90 | 10 | 10 |
| Notched Izod[1] Impact ⅛" ft.-lb/in | 1.91 | 2.02 | 2.17 | 2.13 | 2.09 | 1.72 | 1.92 |
| Impact After Aging 70° C. at 100% Relative Humidity (ft-lb/in) after | | | | | | | |
| 5 Days | 1.72 | 1.81 | 1.87 | 1.78 | 1.73 | 1.75 | 1.96 |
| 12 Days | 1.33 | 1.55 | 1.56 | 1.60 | 1.63 | 1.58[3] | 1.58[3] |
| 20 Days | 1.52 | 1.35 | 1.29 | 1.51 | 1.52 | 1.43 | 1.36 |
| 41 Days | 1.60 | 1.54 | 0.95 | 0.93[2] | 1.13 | Failed[4] | Failed[4] |
| 82 Days | 1.49 | 1.53 | 1.22 | 1.26 | 0.97 | | |
| Oxygen Index | | | | | | | |

TABLE II-continued

| Properties and | Examples | | | | | | |
|---|---|---|---|---|---|---|---|
| Compositions | XI | XII | XIII | XIV | XV | XVI | XVII |
| (ASTM D-2863) | 28% | 28% | 29% | 29% | 29% | 28% | |

[1] Average of 3 test specimen
[2] 42 Days Aging
[3] 10 Days Aging
[4] Usually cracked not capable of testing Although the conventional stabilizers (Examples XVI and XVII) show good polycarbonate melt stabilities, the impact aging characteristics under hydrolyzing conditions are substantially poorer than the polycarbonates stabilized with the phenolic stabilizers of the invention. Thus, the superior hydrolytic stability of the stabilizers of the present invention are demonstrated in the presence of barium carbonate and mold release (cerotic acid ester of ceryl alcohol) which are generally acknowledged to be detrimental to hydrolytic aging properties.

Although the invention has been illustrated with reference to specific materials it is only to be limited as is set forth in the accompanying claims.

What is claimed is:

1. In a polycarbonate comprising a polycarbonate resin having sufficient halogen therein to provide flame retardant characteristics to said polycarbonate, the improvement comprising having intimately mixed with said polycarbonate a stabilizing amount of a hindered phenol of the structural formula:

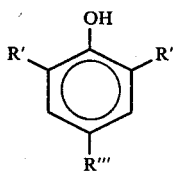

wherein R' is a bulky hydrocarbon alkyl group having 4 to 22 carbon atoms and having sufficient bulk to prevent inactivating reactions of the stabilizing hydroxyl group, R''' is an organic, unbranched residue having at least 10 carbon atoms which may contain an alkyl-oxyl carbonyl alkyl group, and said hindered phenol has a molecular weight between 450 and 1600.

2. The polycarbonate of claim 1 wherein said stabilizer is present in from 0.05 to 1 percent by weight based on the weight of said polycarbonate.

3. A polycarbonate comprising:
   (I) a polycarbonate resin having reacted therein a di-(monohydroxyhaloaryl)-alkane in a sufficient quantity to provide flame retardant characteristics to said polycarbonate;
   (II) an effective amount of barium carbonate; and
   (III) a stabilizing amount of the 3:1 condensate of 3-methyl-6-tert-butyl-phenol with crotonaldehyde.

4. The polycarbonate of claim 1 wherein said R' group contains a tertiary carbon attached to the aromatic ring.

5. The polycarbonate of claim 4 wherein R' is tertiary butyl.

6. A polycarbonate comprising:
   (i) a polycarbonate resin having reacted therein a di-(monohydroxyhaloaryl)-alkane in sufficient quantity to provide flame retardant characteristics to said polycarbonate; and
   (ii) a stabilizing amount of a hindered phenol of the structural formula:

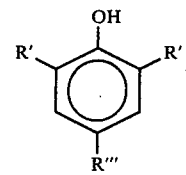

wherein R' is a bulky hydrocarbon alkyl group having 4 to 22 carbon atoms and having sufficient bulk to prevent inactivating reactions of the stabilizing hydroxyl group, R''' is an organic, unbranched residue having at least 10 carbon atoms which may contain an alkyl-oxyl carbonyl alkyl group, and said hindered phenol has a molecular weight between 450 and 1600.

7. The polycarbonate of claim 6, wherein said polycarbonate resin contains 3 to 10% by weight halogen.

8. A polycarbonate comprising:
   (I) a polycarbonate resin having reacted therein a di-(monohydroxyhaloaryl)-alkane in a sufficient quantity to provide flame retardant characteristics to said polycarbonate;
   (II) an effective amount of barium carbonate; and
   (III) a stabilizing amount of octadecyl 3-(3',5'-di-tert-butyl-4'-hydroxyphenyl)propionate.

9. The polycarbonate of claim 6 wherein said phenolic compound stabilizer is present in from 0.05 to 1 percent by weight based on the weight of said polycarbonate.

10. In a polycarbonate comprising a polycarbonate resin having sufficient halogen therein to provide flame retardant characteristics to said polycarbonate, the improvement comprising having intimately mixed with said polycarbonate a stabilizing amount of the reaction product of a hindered phenol of the structural formula:

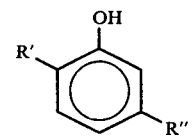

and an α,β-unsaturated aldehyde having 3 to 9 carbon atoms wherein said reaction is at a ratio of 3 hindered phenol:1 aldehyde, and wherein R' is a bulky hydrocarbon alkyl group having 4 to 22 carbon atoms and having sufficient bulk to prevent inactivating reactions of the stabilizing hydroxyl group, and R'' is an alkyl radical having 1-22 carbon atoms.

11. The polycarbonate of claim 10 wherein said stabilizer is the 3:1 condensate of 3-methyl-6-tert.-butyl-phenol with crotonaldehyde.

12. In a polycarbonate comprising a polycarbonate resin having sufficient halogen therein to provide flame retardant characteristics to said polycarbonate and having intimately mixed therein an effective amount of barium carbonate, strontium carbonate or calcium carbonate, the improvement comprising having intimately mixed with said polycarbonate a stabilizing amount of the reaction product of a hindered phenol of the structural formula:

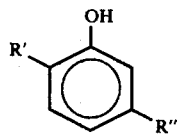

and an α,β-unsaturated aldehyde having 3 to 9 carbon atoms wherein said reaction is at a ratio of 3 hindered phenol:1 aldehyde and, wherein R' is a bulky hydrocarbon alkyl group having 4 to 22 carbon atoms and having sufficient bulk to prevent inactivating reactions of the stabilizing hydroxyl group, and R" is an alkyl radical having 1–22 carbon atoms.

13. In a polycarbonate comprising a polycarbonate resin having sufficient halogen therein to provide flame retardant characteristics to said polycarbonate and having intimately mixed therein an effective amount of barium carbonate, strontium carbonate or calcium carbonate, the improvement comprising having intimately mixed with said polycarbonate a stabilizing amount of a hindered phenol of the structural formula:

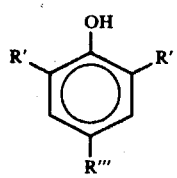

wherein R' is a bulky hydrocarbon alkyl group having 4 to 22 carbon atoms and having sufficient bulk to prevent inactivating reactions of the stabilizing hydroxyl group, R''' is an organic, unbranched residue having at least 10 carbon atoms which may contain an alkyl-oxyl carbonyl alkyl group, and said hindered phenol has a molecular weight between about 450 and 1600.

14. A polycarbonate comprising:
(i) a polycarbonate resin having reacted therein a di-(monohydroxyhaloaryl)alkane in sufficient quantity to provide flame retardant characteristics to said polycarbonate; and
(ii) a stabilizing amount of the reaction product of a hindered phenol of the structural formula:

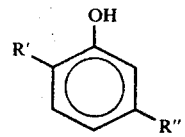

and an α,β-unsaturated aldehyde having 3 to 9 carbon atoms wherein said reaction is at a ratio of 3 hindered phenol:1 aldehyde, and wherein R' is a bulky hydrocarbon alkyl group having 4 to 22 carbon atoms and having sufficient bulk to prevent inactivating reactions of the stabilizing hydroxyl group, and R" is an alkyl radical having 1–22 carbon atoms.

15. The polycarbonate according to claim 6 having intimately mixed therein an effective amount of barium carbonate, strontium carbonate or calcium carbonate.

16. The polycarbonate according to claim 14 having intimately mixed therein an effective amount of barium carbonate, strontium carbonate or calcium carbonate.

17. In a polycarbonate comprising a polycarbonate resin having sufficient halogen therein to provide flame retardant characteristics to said polycarbonate, the improvement comprising having intimately mixed with said polycarbonate a stabilizing amount of octadecyl 3-(3',5'-di-tert-butyl-4'-hydroxyphenyl)propionate.

18. In a polycarbonate comprising a polycarbonate resin having sufficient halogen therein to provide flame retardant characteristics to said polycarbonate and having intimately mixed therein an effective amount of barium carbonate, strontium carbonate or calcium carbonate, the improvement comprising having intimately mixed with said polycarbonate a stabilizng amount of the 3:1 condensate of 3-methyl-6-tert-butyl-phenol with crotonaldehyde.

19. In a polycarbonate comprising a polycarbonate resin having sufficient halogen therein to provide flame retardant characteristics to said polycarbonate and having intimately mixed therein an effective amount of barium carbonate, strontium carbonate or calcium carbonate, the improvement comprising having intimately mixed with said polycarbonate a stabilizing amount of octadecyl 3-(3',5'-di-tert-butyl-4'-hydroxyphenyl)propionate.

20. A polycarbonate comprising:
(I) a polycarbonate resin having reacted therein a di-(monohydroxyhaloaryl)-alkane in a sufficient quantity to provide flame retardant characteristics to said polycarbonate; and
(II) a stabilizing amount of the 3:1 condensate of 3-methyl-6-tert-butyl-phenol with crotonaldehyde.

21. A polycarbonate comprising:
(I) a polycarbonate resin having reacted therein a di-(monohydroxyhaloaryl)-alkane in a sufficient quantity to provide flame retardant characteristics to said polycarbonate; and
(II) a stabilizing amount of octadecyl 3-(3',5'-di-tert-butyl-4'-hydroxyphenyl) propionate.

* * * * *